United States Patent

[15] 3,651,866

Lileg et al.

[45] Mar. 28, 1972

[54] LIQUID COOLANT INSTALLATION FOR A NUCLEAR REACTOR

[72] Inventors: Johann Lileg; Kurt Reif, both of Graz, Austria

[73] Assignee: Maschinenfabrik Aktiengesellschaft, Graz-Andritz, Austria

[22] Filed: July 18, 1969

[21] Appl. No.: 842,891

[30] Foreign Application Priority Data

July 30, 1968 Austria ..............................A 7396/68

[52] U.S. Cl..................................165/107, 176/37, 176/65, 165/134, 415/112, 415/176
[51] Int. Cl..........................................................F28f 19/00
[58] Field of Search....................165/107, 108, 134; 176/37, 176/65; 415/112, 176

[56] References Cited

UNITED STATES PATENTS 3,153,618 10/1964 Acklin..................................176/37 X
3,213,798 10/1965 Carswell................................415/112
3,222,255 12/1965 Maldague..............................176/37

FOREIGN PATENTS OR APPLICATIONS 1,273,080 8/1959 Germany................................176/37

Primary Examiner—Frederick L. Matteson
Assistant Examiner—Theophil W. Streule
Attorney—Kurt Kelman

[57] ABSTRACT

A main pump is incorporated in a liquid coolant circulation system. A drive shaft extends from said main pump and is operable to cause said main pump to circulate liquid coolant in said system. A shaft seal surrounds said shaft and is arranged to permit liquid to leak from said system when said liquid coolant circulates therein. A purifier unit is adapted to receive said leakage liquid and to purify the same by removing solid particles therefrom and to discharge purified leakage liquid to said circulation system.

6 Claims, 1 Drawing Figure

PATENTED MAR 28 1972
3,651,866
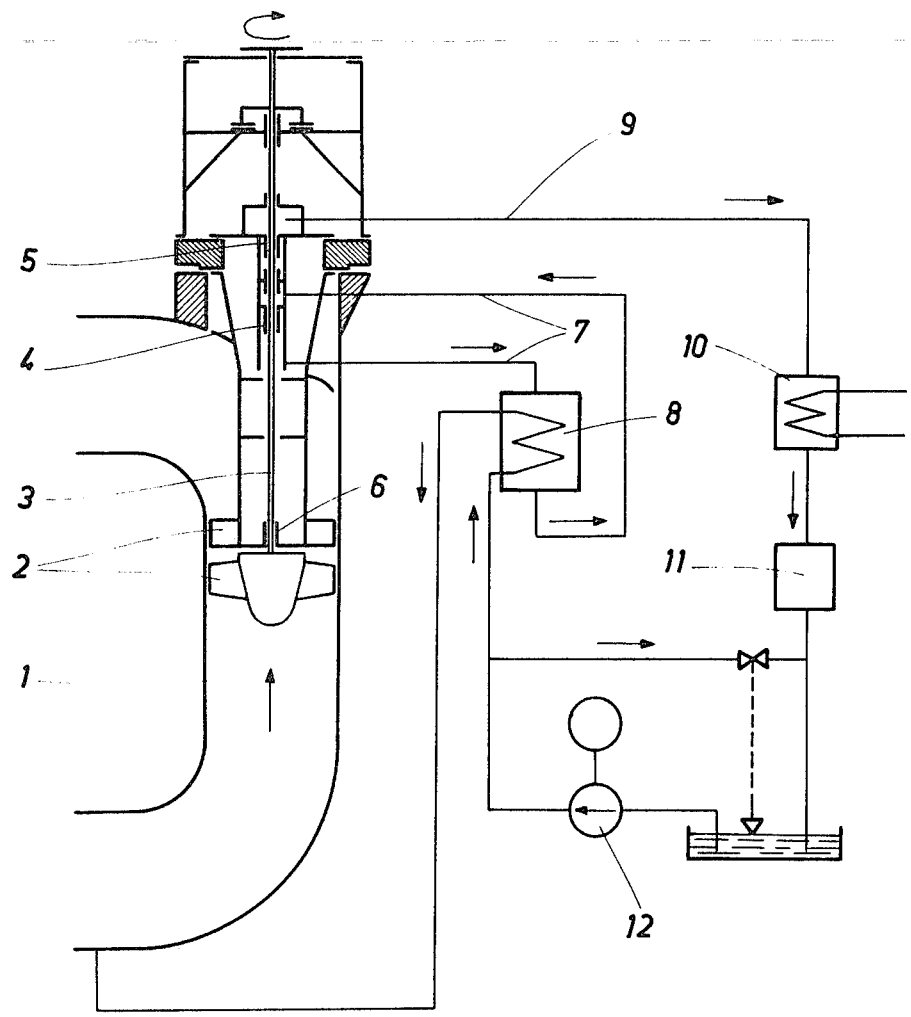
INVENTORS
JOHANN LILEG
KURT REIF
BY
AGENT

LIQUID COOLANT INSTALLATION FOR A NUCLEAR REACTOR

This invention relates to an installation for purifying the liquid coolant for nuclear reactors, which installation comprises a liquid coolant circulation system, in which the liquid coolant is circulated by an externally driven main pump having a shaft seal, which consists of a set of clearance-defining sealing elements, particularly sealing elements which define cylindrical clearances, and a secondary flow path branching from said system and including a purifier unit.

In the liquid coolant circulation system for a nuclear reactor, wear and corrosion always give rise to the formation of small amounts of solid particles. Whereas these particles are only microscopic in size, they are radio-active. For this reason, part of the liquid coolant is conducted for purification through the purifier unit in the secondary flow path so that these solid particles are removed rather than being enriched in the liquid coolant.

In the previous practice, liquid coolant is branched from the circulation system at one point thereof and is passed through a heat exchanger, pressure-relieved through a throttle valve and passed to the purifier unit. The purified liquid coolant is then pressurized by a high-pressure pump and through the heat exchanger is returned to the liquid coolant circulation system. A separate throttle valve or the like is required to pressure-relieve the stream to be purified because a pressure of about 160 kilograms per square centimeter above atmospheric pressure is maintained in the liquid coolant circulation system and such a high pressure is not desired in the secondary flow path. This throttle valve or the like adds to the structural expenditure.

All these installations involve special difficulties regarding the sealing of the shaft of the main pump, which shaft extends out of a pipe bend or the like. These difficulties are due to the fact that a high superatmospheric pressure and a temperature of about 280° C. are maintained in the liquid coolant circulation system and because any leakage of liquid must be virtually prevented owing to the radiation and poisoning risk. The clearance seals mainly used must be made with a particularly high dimensional accuracy and precision and from special materials. This results in a disproportionately high expenditure. Besides, it is necessary in most cases to supply sealing liquid to the seals and this results in heat losses.

It is an object of the invention to eliminate these disadvantages and to provide an installation of the kind defined first hereinbefore in which the structural expenditure for the secondary flow path is reduced and simpler and less expensive shaft seals may be used for the main pump.

This object is accomplished according to the invention essentially in that the shaft seal of the main pump is designed for a leakage rate which corresponds to the flow rate of the liquid to be purified and the secondary flow path is supplied with that leakage liquid. Hence, a perfect seal of the shaft is not desired and the leakage liquid is purified in the secondary flow path and is then returned into the liquid coolant circulation system. This has the advantage, above all, that the sealing elements for the shaft may now have relatively large clearances and can be made much more easily and at a lower cost than the previous designs. The necessary pressure relief is effected automatically at the seals so that there is no need for a special throttle valve or the like for the secondary flow path. Finally, there is no need to supply a sealing liquid to the seal so that the heat loss energy otherwise dissipated by the sealing liquid is saved.

A particularly desirable arrangement will be obtained if, in accordance with the invention, the secondary flow path comprises a conduit which extends from a point succeeding the guide bearing for the main pump shaft or succeeding a first sealing element outwardly to a heat exchanger and from the latter back to a point which succeeds an intermediate sealing element, and another conduit which includes an aftercooler and connects the outer end of the seal to the purifier unit, whereas a high-pressure pump moves in known manner the purified liquid from the purifier unit through the heat exchanger to the liquid coolant circulation system at a point thereof which precedes the main pump. The leakage liquid must be cooled in the heat exchanger in order to avoid an evaporation of liquid as it is pressure-relieved in the sealing elements.

The accompanying drawing is a diagrammatic representation showing by way of example an installation in accordance with the invention for purifying the liquid coolant for nuclear reactors.

In a pipe system 1, a circulation of liquid coolant is maintained by a main pump 2. The shaft 3 of that pump extends outwardly and is driven from an external power source. The shaft seal consists of a set of sealing elements 6, 4, 5, which define cylindrical clearances. Liquid coolant conduit 7 branches off behind shaft guide bearing 6, which serves as the first sealing element, and in front of sealing element 4 to a heat exchanger 8 and from the latter back to a point behind the intermediate sealing element 4. The leakage liquid is thus cooled in the heat exchanger 8 and then flows through the outer sealing elements 5. The liquid which has passed through the sealing elements flows through another conduit 9 and a cooler 10 to the purifier unit 11. A high-pressure pump 12 moves the liquid from the purifier unit 11 through the heat exchanger 8 back to the liquid coolant circulation system at a point thereof which precedes the main pump 2.

We claim:

1. A liquid coolant installation for a nuclear reactor, comprising
   1. a liquid coolant circulation system;
   2. a main pump in said system and arranged to circulate the liquid coolant therethrough;
   3. a drive shaft connected to said main pump and operable to drive said main pump to circulate the liquid coolant through said system;
   4. a shaft seal surrounding said shaft and arranged to permit circulating coolant liquid to leak from said system; and
   5. a liquid coolant purifying circuit including a purifier unit, said circuit being arranged to receive the liquid leaking from said system, to deliver the same to the purifier unit and to discharge the purified liquid to said circulation system.

2. An installation as set forth in claim 1, in which said shaft seal comprises a plurality of successive sealing elements.

3. An installation as set forth in claim 2, in which said sealing elements define cylindrical clearances.

4. An installation as set forth in claim 2, wherein the main pump has an inlet and an outlet; the shaft extends from the outlet of the pump; the seal comprises a first one of the sealing elements next to the pump outlet, an intermediate one of the sealing elements axially outwardly spaced from the first sealing element, and an outer one of the sealing elements axially outwardly spaced from the intermediate sealing element; and a heat exchanger circuit connected to the shaft seal and including a heat exchanger, said heat exchanger circuit being arranged to receive the liquid leaking through the first sealing element, to deliver the same to the heat exchanger and to discharge the heat exchanged liquid to the seal between the intermediate and the outer sealing elements.

5. An installation as set forth in claim 4, wherein the liquid coolant purifying circuit is arranged to receive the heat exchanged liquid leaking through the outer sealing element, a cooler is arranged in the purifying circuit between the outer sealing element and the purifier unit, a highpressure pump is connected between the purifier unit and an input of the heat exchanger, and an output of the heat exchanger is connected to the liquid coolant circulation system ahead of the inlet of the main pump.

6. An installation as set forth in claim 4, wherein the first sealing element is a guide bearing for the shaft.

* * * * *

UNITED STATES PATENT OFFICE
CERTIFICATE OF CORRECTION

Patent No. 3,651,866          Dated  Mar. 28, 1972

Inventor(s)  Johann Lileg et al

It is certified that error appears in the above-identified patent and that said Letters Patent are hereby corrected as shown below:

Page 1, at (73), change "Aktiengesellschaft" to --Andritz Actiengesellschaft--

Signed and sealed this 18th day of July 1972.

(SEAL)
Attest:

EDWARD M. FLETCHER, JR.　　　　　ROBERT GOTTSCHALK
Attesting Officer　　　　　　　　Commissioner of Patents